United States Patent [19]
Shearwood et al.

[11] Patent Number: 5,955,800
[45] Date of Patent: Sep. 21, 1999

[54] LEVITATION SYSTEMS

[75] Inventors: Christopher Shearwood; Connel Brett Williams; Robert Barret-Yates; Phillip Henry Mellor, all of Sheffield, United Kingdom

[73] Assignee: University of Sheffield, Sheffield, United Kingdom

[21] Appl. No.: 08/952,335

[22] PCT Filed: Apr. 4, 1996

[86] PCT No.: PCT/GB96/00835

§ 371 Date: Nov. 14, 1997

§ 102(e) Date: Nov. 14, 1997

[87] PCT Pub. No.: WO96/31941

PCT Pub. Date: Oct. 10, 1996

[30] Foreign Application Priority Data

Apr. 6, 1995 [GB] United Kingdom .................... 9507184
Sep. 23, 1995 [GB] United Kingdom .................... 9519461

[51] Int. Cl.⁶ .......................... G01C 19/24; H02N 15/00; H02K 17/16
[52] U.S. Cl. ..................................... 310/40 MM; 310/309
[58] Field of Search ................................. 310/12, 13, 14, 310/309, 40 MM, 90.5

[56] References Cited

PUBLICATIONS

Journal of Vacuum Science and Technology Part A vol. 7, No. 2, Mar. 1989, pp. 214–217, Magnetic Ultrafuge With a Microshell Rotor by Pavel E. Moroz and F. Neff Weber.

Reports on Progress in Physics, vol. 44, No. 4, Apr. 1981 (England) pp. 411–477 Electromagnetic Suspension and Levitation by B.V. Jaya want.

Sensors and Actuators, vol. 20, No. 1, Nov. 15, 1981, pp. 97–106, An Analysis of Electroquasistatic Induction Micromotors Stephen F. Bart and Jeffrey H. Lang.

Proceedings of the Workshop on Micro Electro Mechanical Systems (ME, Fort Lauderdale, Feb. 7–10, 1993 No. Workshop 6, Feb. 7, 1993, Institute of Electrical and Electronics Engineering, pp.1–6.

A Planar Variable Reluctance Magnetic Micromotor With Fully Integrated Stator and Wrapped Coils by Chong H Ahn et. al.

*Primary Examiner*—Nestor Ramirez
*Assistant Examiner*—Judson H. Jones
*Attorney, Agent, or Firm*—Fish & Richardson P.C.

[57] ABSTRACT

A levitation system which comprises: (a) a high conductivity body member having a greatest dimension of less than 1500 $\mu$m; (b) a force generator for producing a levitating force on the body member; and (c) a miniature system adapted for rotation which further comprises: a rotating magnetic field such that the body member is rotated in the applied field.

61 Claims, 6 Drawing Sheets

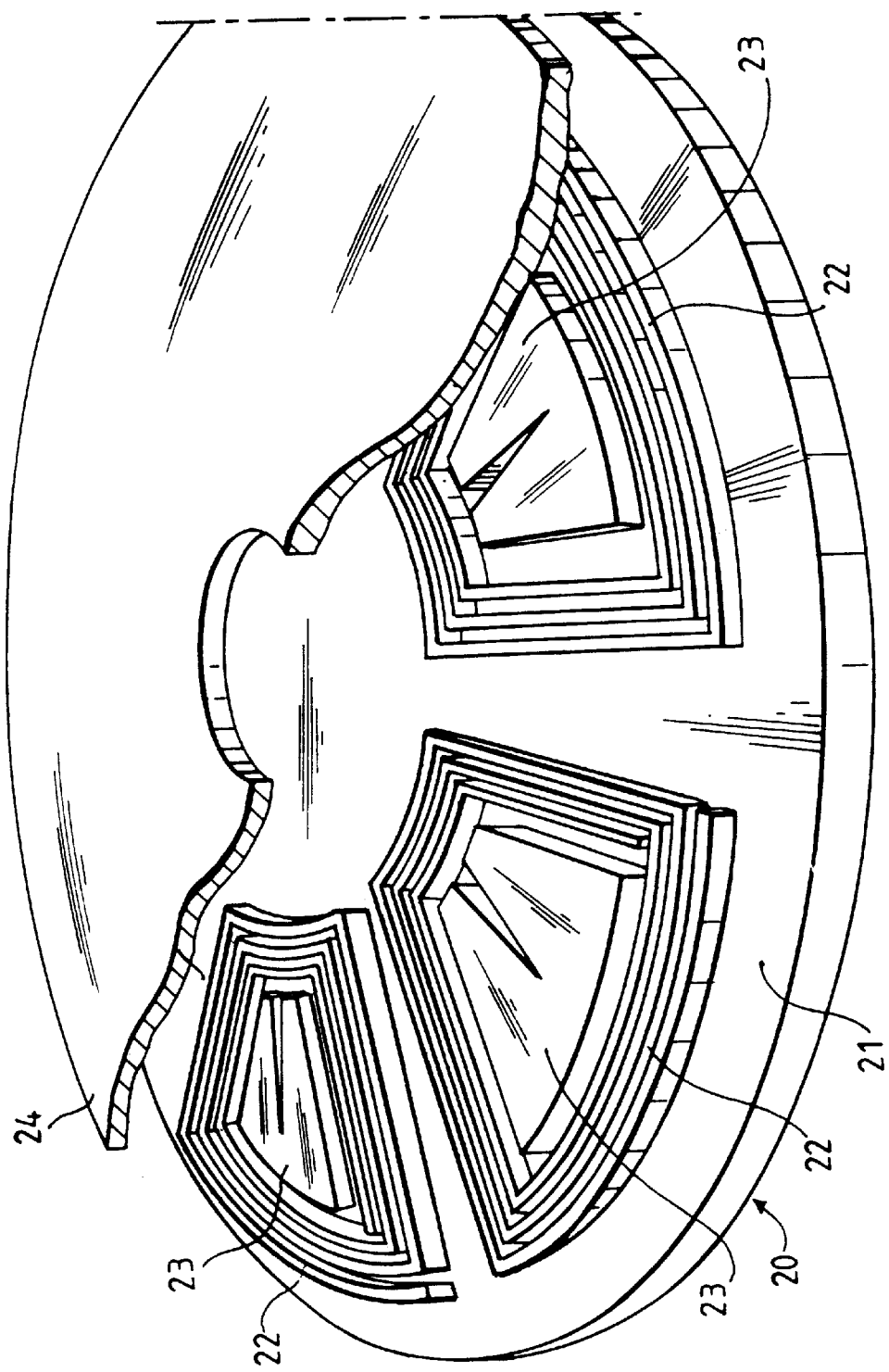

LEVITATION SYSTEMS

This invention relates to levitation systems, and in particular to miniature systems provided with novel levitation and/or drive means for use in miniature rotors, motors, motion detectors, accelerometers, optical devices, positional sensors, and other applications.

Miniature systems such as rotors, gyroscopes and motion or position detection devices having dimensions of a few tens to hundreds of $\mu$m or less have been proposed for use in integrated systems. Typically such miniature systems rely upon the use of mechanical bearings for suspension of the moving parts therein, and consequently due to friction can only operate for a limited period or are very inefficient.

Alternatively, levitation of inertial masses has been achieved, typically without power, using diamagnetism, or electrostatics or indeed the Meissner effect of superconductors. Micromotors based on the use of the electroquasistatic induction principle are disclosed in Bart, S. E. et al "An analysis of electroquasistatic induction micromotors", Sensors and Actuators A, 20 (1989) 97–106, and Fuhr, G. R. et al "Analysis of the torque-frequency characteristic of dielectric induction motors", Sensors and Actuators A. 33 (1992) 237–247, and on the Meissner Effect in superconductors in Kin Y et al "A levitation-type microactuator using the Meissner effect of high-Tc Superconductors", Sensors and Actuators A. 29 (1991) 143–150. Some of the disadvantages of micromotors based on these principles of levitation include, for the electroquasistic induction principle, high excitation voltages and, for the Meissner effect in superconductors, the need for a cooling system. The disclosure of all these prior publications are incorporated herein by reference.

Furthermore, miniature rotors, for example, having dimensions of a few tens to a few hundred $\mu$m or less, have been proposed for use in micro motors. Typical of such proposals are the micromotors disclosed in Wagner B. "Linear and rotational magnetic micromotors fabricated using silicon technology" Proc. IEEE Microelectromech. Syst. Workshop, 1992 pp 183–189, and Guckel H. et al "On the application of deep X-ray lithography and sacrificial layers to sensor and actuator construction" Proc. Transducers '91. 6th Int. conf. Solid-State Sensors and Actuators, 1991 which are both concerned with magnetic drives, in Fan L. S. "IC-processed electrostatic micromotors", Sensors and Actuators vol 20 pp 41–47 1989 and Meheregany M. "Operation of microfabricated harmonic and ordinary sidedrive micromotors" Proc. IEEE Microelectromech. Syst. Workshop, 1990 pp 1–8 which both relate to electrostatic drives, in Udayakumar K. R. et al. "Ferroelectric thin film ultrasonic micromotor" in Proc. IEEE Microelectromech. Syst. Workshop, 1991 pp 109–113 which relates to an ultrasonic drive, and in Bart S. F. and Lang J. H. "An analysis of electroquasistatic induction micromotors", Sensors and Actuators, vol 20. pp 97–106, 1989 which describes a dielectric induction drive. In Ahn C. H., Kim Y. J., Allen M. G. "A planar Variable Reluctance Magnetic Micromotor with Fully Integrated Stator and Coils" Journal of Microelectromechanical Systems, Vol 2, No 4, pp 165–173, December 1993, planar integrated meander-type inductive components and their fabrication are described, thus making possible the manufacture of micromotors with fully integrated stator and coils. The disclosures of all these prior publications are incorporated herein by reference.

For practical applications, however, the prior art has not proved to be wholly satisfactory, because the small torques produced are usually only sufficient to overcome friction and aerodynamic drag, such that the prior art micromotors do not produce useful output.

In the fields of personal and land, sea, or air navigation, and in active suspension, braking and steering systems, there is a need to provide a miniature inertial guidance system typically incorporating gyroscope and/or an accelerometer as an essential element thereof. Typical devices for use in automotive applications are required to sense rates of turn in the range of $10^{-4}$ to 1 radian per second. It has been estimated in Europe that there will be a demand for over 100,000 gyroscopes in the automotive industry alone. At present there is no satisfactory sensing device available having the appropriate combination of robustness, small size and sensitivity, and which can be produced economically.

In the field of optics and in particular optical applications in the telecommunications industry, there is a need to provide controllable optical devices such as laser tuning means and controllable focusing devices on the scale of integrated systems. Furthermore, chopping and/or multiplexing of light sources is at present difficult to achieve.

In the field of human interaction with computers or remote control machines, and other fields there is a need to provide positional sensors which are, for example, lightweight and accurate.

According to one aspect of the invention there is provided a levitation system for use in miniature rotor systems, miniature motor systems, miniature motion or position detection systems, miniature optical systems and other applications comprising:

a thin section body member having a greatest dimension less than 1500 $\mu$m; and means for producing a levitating force on the body member.

Preferably the body member comprises a material of high conductivity such as metal or other material apparent to those skilled in the art. Preferably the body member is a disc although other shapes are also possible, for example, an annulus.

The invention will now be further described with reference to the levitation of a metal disc. It is to be understood, however, that the invention is not limited thereto and that other high conductivity thin section members could also be used.

Preferably, the system comprises stabilising means for producing a stabilising force on the metal disc. Preferably, the stabilising means for producing a stabilising force comprises counterbalancing means for applying a counterbalancing force in the Z direction opposing the levitating force and/or means for producing a lateral stabilising force on the disc in the plane of the disc in the x-y direction.

In a preferred embodiment, the means for producing a levitating force on the metal disc comprises means for generating an electromagnetically induced force on the disc. Preferably, the means for producing a levitating force on the metal disc and the means for producing a lateral stabilising force on the disc in the plane of the disc in the x-y direction each comprise a coil assembly. One or more such coil assemblies can be provided. Preferably the coil assembly comprises a thin film of electrically conductive material.

In a preferred embodiment, the means for producing a levitating force comprises a single coil. Preferably, the means for producing a stabilising force comprises a further coil disposed outwardly and spaced from said single coil. Advantageously the means for producing a levitating force comprises at least two coils, which coils are substantially concentric and which coils are arranged so that one of said coils is located inwardly of another of said coils. Ideally, a first coil is spaced inwardly from a second coil, which coils are electrically connected in series. Preferably, the means for producing a lateral stabilising force comprises a third coil spaced outwardly from the second coil.

In a preferred embodiment, the counterbalancing means comprises means for generating an electrostatic force in the z direction opposing the levitating force by means of electrodes arranged beneath the disc.

Levitation systems according to the invention can, in certain embodiments, be used in a miniaturised integrated motion detection system by providing a suspended inertial element and means for stabilising the element in the system. As will be explained below, the system according to the invention also provides for the necessary sensing capability.

Furthermore, it will be understood by those skilled in the art that the system according to the invention will find utility in any application where a small movement is required and/or detection of a small movement is required. For example, by varying the current within one or more coils, the levitating force can be varied so as to raise or lower the disc or to vary its orientation with respect to the means for subjecting the disc to a levitating force. Thus, by adapting the disc to be an optical element the invention could be used for controlling, for example, the optical characteristics of a system e.g. such as the cavity length of a laser or the orientation of an optical path within a system or the focusing characteristics of a system.

In another example such as a micro-weighing gas sensor device the disc may be coated with reactive molecules such that when placed in a reactive medium, a reaction occurs and as particles are removed as part of the reaction, a change in weight or force required for levitation can be determined. Thus, this may be used to measure the rate of reaction.

According to a further aspect of the invention, the system is adapted for rotation of the disc. This embodiment can comprise an asymmetric coil assembly which provides a means for subjecting the disc to a rotating magnetic field.

According to the present invention, a miniature rotor system is provided in which a disc is rotated and at the same time levitated to reduce rotor friction.

According to a preferred aspect of the invention there is provided a miniature rotor system which comprises:

a rotatable metal disc of diameter less than 1500 $\mu$m;

means for subjecting the metal disc to a rotating magnetic field such that the metal disc is rotated in the applied field; and means for producing a levitating force on the metal disc.

In another aspect the invention provides a drive system for a miniature rotor, the rotor comprising a metal disc of diameter less than 1500 $\mu$m, which comprises:

means for subjecting the metal disc to a rotating magnetic field such that the metal disc is rotated in the applied field; and means for producing a levitating force on the metal disc.

In a still further aspect, the invention provides a method for driving a rotatable metal disc of diameter less than 1500 $\mu$m which comprises subjecting the metal disc to a rotating magnetic field such that the metal disc is rotated in the applied field and applying a levitating force to the metal disc whilst it is rotated in the magnetic field.

The invention will henceforth be more particularly described with reference to miniature rotor systems, of a type which can find application in miniature gyroscopes, for example, for inertial navigation systems, positional detectors and in micromotors, but it is to be understood that the invention is not limited thereto, and the rotor system could also be used in many other systems and applications, for example, as a bearing component in other micro systems.

Miniature gyroscopes of the invention can, in certain embodiments, be used together with a miniature flux-gate magnetometer or compass in a miniaturised integrated navigation system. As more particularly described hereinafter, preferred embodiments of the miniature rotor system of the invention are particularly suitable for forming the inertial element of a self-contained gyroscope and may have applications in all fields of inertial navigation, for example in yaw and roll sensors for the active braking system (ABS) of a vehicle or as a personal navigational aid.

Detection of movement in the form of a positional sensor can also be envisaged as a device incorporating a miniature gyroscope. For example, where the position of the device with respect to a fixed reference frame is required, this can be determined. This may have particular application in remotely controlled machines, human-computer interface devices and so on.

In another embodiment, the viscosity of a fluid may be determined by measuring the speed and/or acceleration of a disc when levitated and spun in the fluid.

The metal disc for use in the present invention is preferably made from a lightweight material with high conductivity such as metal, for example, aluminium, and preferably has a diameter of from 300 to 800 $\mu$m, and a thickness of from 2 to 50 $\mu$m. The disc preferably has a smooth polished surface.

Other materials having suitable conductivity such as semiconductors, for example, GaAs and related family of materials can be used for the disc and indeed the coils, coil portions and coil assemblies used in the present invention.

The metal disc is preferably rotated and levitated by a rotating and levitating magnetic field produced by a distributed polyphase coil assembly.

A rotating magnetic field can, for example, be produced by a first coil assembly comprising two or more, preferably arc-shaped, first coil portions positioned at regular intervals around a first inner circle such that when currents with a particular phase orientation are passed through the coil portions, they produce a rotating travelling magnetic field. The first coil assembly can comprise two or more, preferably arc-shaped, second coil portions each of which is correspondingly positioned opposite and outwardly spaced from a first coil portion. Preferably, each of said first coil portions and its corresponding second coil portion are electrically connected in series such that current travels in opposing directions in the first and second coil portions. It will be understood by those skilled in the art, that when said two or more coil portions are excited with high frequency currents of equal magnitude but differing phase displacements they produce a rotating travelling magnetic field. Preferably, 3 or more first and second coil portions are provided.

Alternatively, the rotating magnetic field can, for example, be produced by a first coil assembly which can comprise two, three or more coils positioned at regular intervals around a circle in such a manner that when excited with high frequency currents of equal magnitudes but differing phase displacements they produce a rotating travelling magnetic field. The coils can, for example, be quadrant-shaped, and are preferably 3 or more in number. Preferably the coils form a circle of substantially the same diameter as the disc, and are arranged on a base beneath the disc. It will also be understood by those skilled in the art, that the means for subjecting the metal disc to a rotating magnetic field, can be used to hold the disc in a stationary position under closed-loop, position control, for example, in the situation in which the tendency of the disc is to rotate rather than to rest due to, for example, an externally applied rotational torque.

When the magnetic field is applied, a current pattern is induced in the disc that generates a force system to provide a rotational torque sufficient to spin the disc. The disc can, for example, be rotated at speeds greater than 1000 rpm, preferably at a speed of from 10,000 to 10,000,000 rpm. Preferably the current pattern also provides an additional levitational force acting to levitate the disc.

The drive system preferably also comprises a second coil assembly driven with a high frequency current, generating a further alternating magnetic field which in turn induces currents in the metal disc. The shape and location of the second coil assembly can be such that the interaction of the coil current and the induced disc current generates a force system which levitates the disc (in the z direction) and also provides lateral stability in the plane of the disc (in the x-y directions). The disc is preferably levitated to a height of from 1 to 50 $\mu$m, preferably from 1 to 10 $\mu$m, above the plane of the coils. Preferably there are from 1 to 2 coils in the second coil assembly, and these are preferably arranged on the base within the circle of the first coil assembly.

The first and second coil assemblies may be separate or combined as a single coil set.

To enhance the strength of the generated magnetic fields and to improve their coupling with the disc, the coils are preferably deposited on a substrate layer of soft magnetically permeable material. A layer of insulating material is preferably positioned between the coils and the soft magnetic material. If desired, the soft magnetic material may be formed into slots into which the coils are laid. The substrate layer of magnetic material and the coil assemblies together form the base on which the metal disc rests when no current is applied.

Preferably the levitation force system created by the first and second coil assemblies is counterbalanced by a restoring force system in the z direction which acts to attract the metal disc towards the base of the device. This restoring force system can be created, for example, by placing a third coil or coil assembly above the disc, the third coil, or coil assembly, being mounted on a substrate which can be magnetically permeable. This substrate then preferably forms the roof of a structure which fully encloses the metal disc.

In an alternative construction, a system of electrodes distributed among the first or second coil assemblies can be used to provide the restoring force through electrostatic attraction. The electrodes can be positioned, for example, within one or more coils of the first and second coil assemblies. A controlled DC voltage applied to the electrodes could vary the magnitude of the restoring force.

The first and second coil assemblies and the electrode system may be formed as one part by connecting capacitors in series with the coils in a manner that allows parts of the coils to be excited with differing DC voltages whilst conducting a high frequency alternating current.

In preferred embodiments of the invention, the combined effect of the levitation, lateral stability and restoring force systems is to allow the metal disc to be held freely in a stable fixed position with respect to the coil assemblies and electrode systems regardless of the orientation of the disc and coil assemblies. As the disc is suspended freely without mechanical contact it can be rotated at high speed with minimal frictional losses.

When operated as an inertial element for a gyroscope the disc is preferably fully surrounded to ensure that on removal of the supply to the levitating system it will settle in a position on the base that on reinstatement of the supply will allow the levitation to be reestablished.

Enclosure of the disc can also reduce aerodynamic drag on the disc, for example, by providing a means by which it could be operated in a reduced pressure environment or in a nitrogen, or inert gas atmosphere.

In preferred embodiments, the disc can be used as a sensing element of a rate of turn sensor by monitoring the angle of tilt of the disc as it precesses under gyroscopic forces. The orientation of the disc can be sensed by capacitative means, for example, by incorporating sensing electrodes below the disc.

The system of the invention can also be used as an accelerometer or in an inertial guidance system by measuring the rate of change of height and/or angle of tilt of the disc with respect to the levitation means, when same is moved with respect to the disc.

In further preferred embodiments, the disc can be used as an optical element by coating or otherwise providing a reflective surface on one side thereof or by incorporation of a micro-lens therein. The orientation and/or height of the disc with respect to the base can be controlled by manipulating the levitating force and sensing the height and/or angle of tilt of the disc by, typically, capacitive sensors positioned about the disc.

Furthermore, the system according to the invention can be used for carrying loads on the metal disc.

Preferred embodiments of the invention will now be described by way of example with reference to the accompanying Drawings in which:

FIG. 3 shows a perspective view, with parts of the rotor broken away for clarity, of a third embodiment of a rotor and drive system according to the invention;

Figure 1:
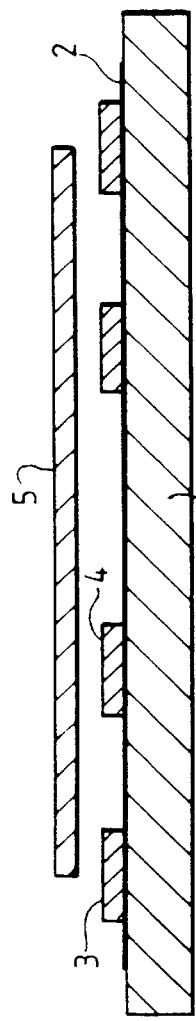
FIG. 1 shows a diagrammatic representation of a first embodiment of a miniature rotor and drive system according to the invention in sectional side elevation.

Referring first to FIG. 1, the device comprises a magnetically permeable substrate 1 upon which there is laid an insulating layer 2 which may comprise, for example, a polyimide or similar insulating polymeric material. Deposited on the insulating layer z are outer and inner coil assemblies 3, 4, which are arranged in a circular pattern on the substrate 1. Above the coils there is positioned an aluminium disc 5 of diameter 500 82 m and thickness 5 μm.

The inner coil assembly 4 comprises a single coil driven with a high frequency current of magnitude 200 mA rms and frequency 10 MHz, generating an alternating magnetic field which in turn induces currents in the disc 1. The threshold current necessary to produce a force equal to the weight of the disc will vary with the weight of the disc. The shape and location of the turns of the inner coil assembly is such that the interaction of the coil current and the induced disc current generates a force system which levitates the disc in the z direction as shown, and provides lateral stability in the plane of the disc in the x-y directions.

The outer coil assembly 3 comprises six coils positioned at regular intervals such that when excited with high frequency currents of equal magnitudes but differing phase displacements there is produced a rotating travelling magnetic field which induces a current pattern in the disc that generates a force system to provide a rotational torque to spin the disc, together with an additional levitational force. The applied high frequency current has a magnitude of 300 mA and a frequency of 10,000–10 M Hz.

The magnetically permeable substrate 1 serves to enhance the strength of the generated magnetic field and to improve their coupling with the disc.

Figure 2:
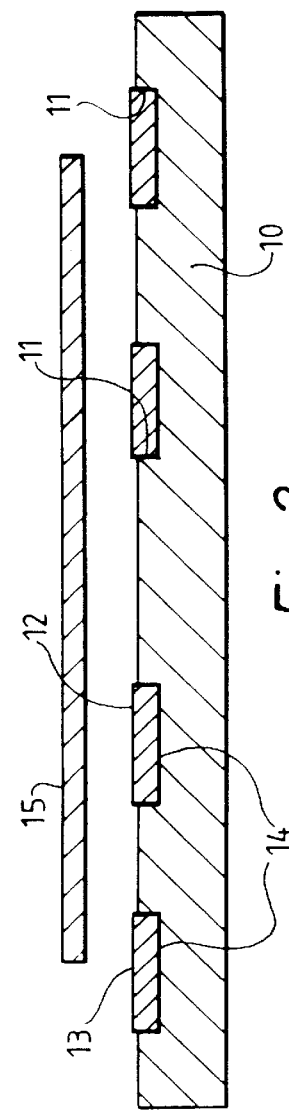
FIG. 2 shows a diagrammatic representation in sectional side elevation of a second embodiment of a rotor and drive system according to the invention.

Referring now to FIG. 2, there is shown a device somewhat similar to FIG. 1 except that the magnetically permeable substrate 10 is provided with slots 11 within which the inner and outer coil assemblies 12, 13 are positioned. This protects the coils from chafing against the rotating disc. An insulating layer 14 is sandwiched between the coils 12 and 13 and the substrate 10. The disc 15 is rotated and levitated by the coil assemblies in a similar fashion to the disc of FIG. 1.

Referring now to FIG. 3 there is shown a further embodiment of the invention suitable for an electromagnetic induction micromotor in which the device comprises a magnetic core substrate 20, formed from nickel-iron, coated with an insulation layer 21, which may be, for example, a polyimide or similar insulating polymeric material. Deposited on the insulation layer 21 are six segment-shaped aluminium coil windings 22 equally displaced around the substrate 20. Within each of the aluminium windings 22 there is a sensing and control electrode 23, which comprises a deposited gold layer. Positioned above the substrate and the aluminium coil windings is an aluminium rotor disc 24 of diameter 500 μm and thickness 5 μm.

A high frequency three phase current is applied to the aluminium windings 22, providing a rotational torque to spin the disc and a levitation force in the z direction. The levitational force due to the magnetic field is countered by an attractive electrostatic force developed by an electric field obtained from the distributed set of electrodes 23 under the rotated disc, and within the aluminium windings. The DC voltage applied to the electrodes 23 is controlled under closed loop feedback to maintain the rotating disc 24 in a fixed, stable position at 5 to 10 μm above the substrate 20. Feedback of the position of the disc can be found by capacitative measurements from the electrodes 23. The system thus operates under a balance force regime and the voltages applied to the electrodes 23 give a direct indication of the gyroscopic movements.

Figure 4B:
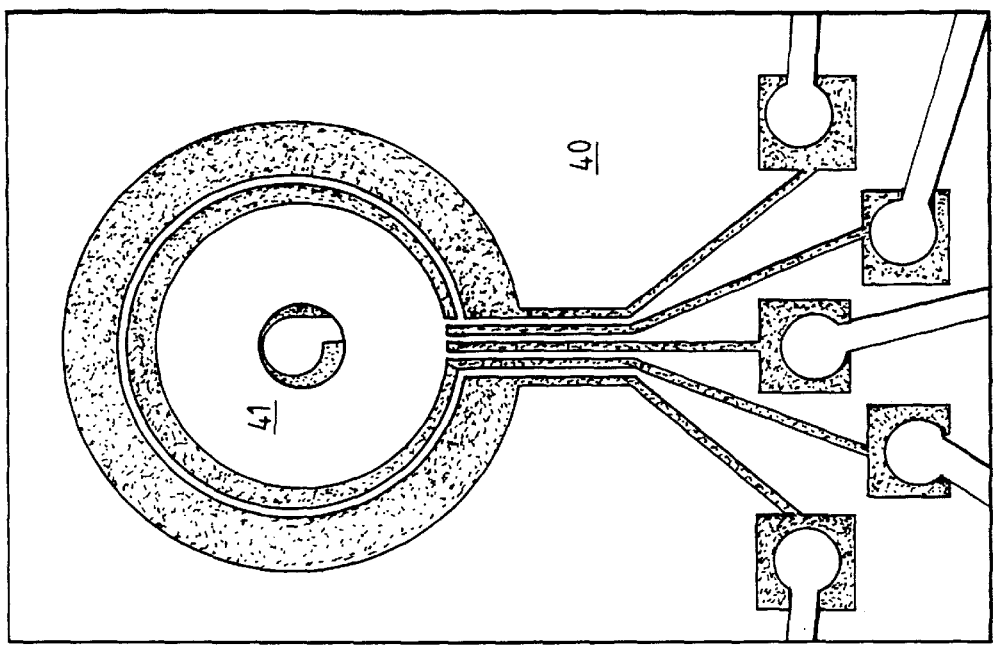
FIG. 4 shows a plan view of a fourth embodiment of a miniature system according to the invention having an asymmetrically shaped coil for producing a rotating magnetic field a) shown without the metal disc b) shown with the metal disc.
Figure 4A:
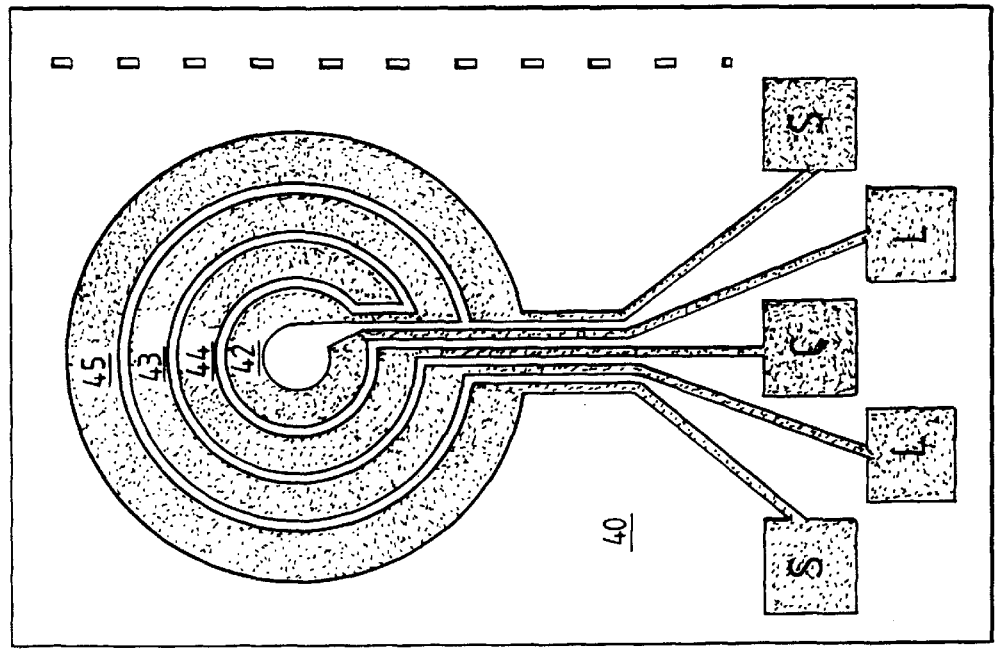

Referring now to FIG. 4 there is shown a further embodiment of the invention suitable for use as a rotating gyroscope for in aerospace and automotive applications. An aluminium rotor 41 is levitated above a magnetically soft substrate by two inner gold coils 42 and 43. An outer coil 45 provides lateral stability for aluminium rotor disc 41. Here, aluminium disc 41 is 400 μm in diameter and 12 μm thick. Substrate 40 includes a high permeability backing plane comprising 2.2 μm amorphous FeFiBC film electrically isolated from the 1.3μthick gold coils 42–45 by 0.2 μm $Si_3N_4$. Beneath the backing plane, the substrate comprises silicon (001) chosen for VLSI compatibility. Disposed between the two levitation coils is a sense coil 44 which functions as a sense electrode. The capacitance between the sense electrode and the levitation coils is modified by the proximity of the rotor 41 giving a measurement of rotor height.

Levitation of rotor 41 is achieve by excitation of the coils 42, 43 with a 10 MHz a.c. current. Levitation can be varied by varying the rms excitation current. In this the particular embodiment, the rotor rotates freely when levitated due to a small rotational torque induced on the disc by a rotating magnetic field produced when the coils are energised as a result of the asymmetry of the coils in this particular design. Maximum current densities in the levitation coils 42,43 were $5 \times 10^9$ $A/M^2$ and the stability coil 45 was $3 \times 10^9$ $A/M^2$. These large values of J are possible due to the large surface to volume ratio of the thin conductor tracks in the coils. The aluminium rotor is levitated to a height of approximately 30 μm. The levitation height can be determined by a measure of the capacitance between the sense electrode and the levitation coils or optically as would be well understood by those skilled in the art. Excitation of the stability coil produces lateral stability such that when displaced by, for example, 100 μm, the aluminium disc 41 is automatically re-centred or, if displaced prior to levitation, the disc is re-centred when it is levitated. With the addition of a counterbalancing force which opposes the levitation force generated by the levitation coils 42,43, the rotor disc 41 can be held in equilibrium even if the sensor is tilted or inverted by the balance between the opposing forces. Typically, an attractive electrostatic field between the rotor 41 and substrate 40 can be generated by providing electrodes (not shown) distributed about the coil assembly so as to produce an attractive electrostatic force on the rotor. Indeed the height of levitation can be controlled by controlling these two opposing forces. Alternatively, a further coil assembly or other means generating a repulsive force can be placed above the disc (not shown).

It will be apparent to those skilled in the art from the above that it is only on the scale of the devices described, or on a lesser scale, that electromagnetic and electrostatic forces of comparative magnitude can be achieved in order to establish counter balancing forces acting on the disc. It will further be apparent that the embodiments described herein can be used to levitate only or to levitate and rotate the disc as desired.

Figure 5:
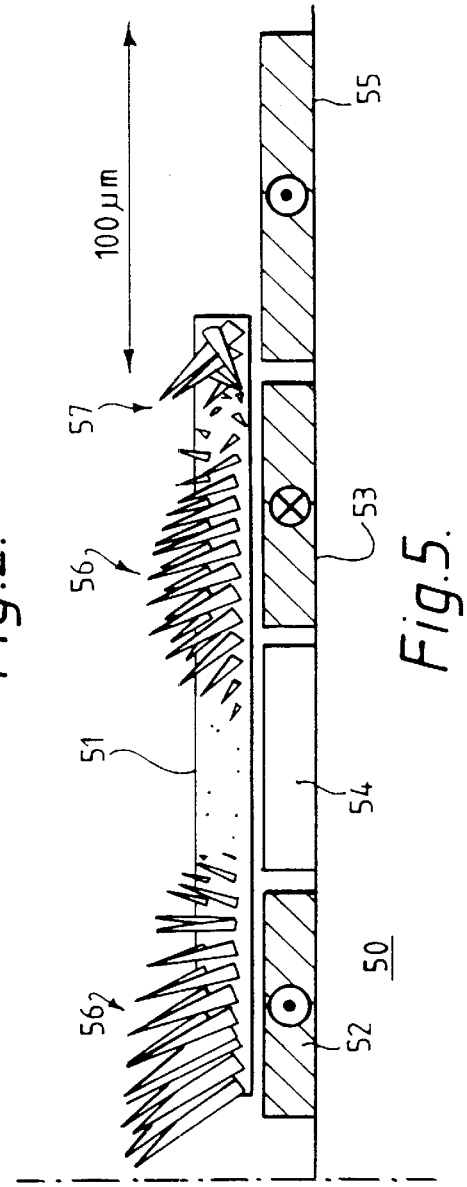
FIG. 5 shows a diagrammatic representation in sectional side elevation of a fourth embodiment of a miniature system in accordance with the invention.

The action of the stability coils can be more clearly seen in FIG. 5 in which a cross-section through a coil assembly in accordance with the invention is shown. Here, levitation coils 52 and 53 are disposed on a substrate 50. A sense electrode is positioned between coil 52 and 53 and a stability coil 55 is positioned outside coil 53. The coil current directions are indicated by the crosses and dots shown on coils 52, 53, and 55 (out of, into and out of the paper respectively). Arrows 56 represent the force vectors generated by the currents shown in coils 52 and 53 and disc 51. Thus there is a net force levitating the disc. Arrowheads 57 indicate the force vectors on disc 51 generated by the current flow out of the paper into stability coil 55. In this instance, disc 51 has been displaced 10 μm to the right. Thus a force 57 restores the disc to the coil centre and also provides a proportion of the total levitational force in addition to force 56.

A central hole in disc 41 reduced unnecessary mass and aids the release process of disc 41 during fabrication.

Figure 6:
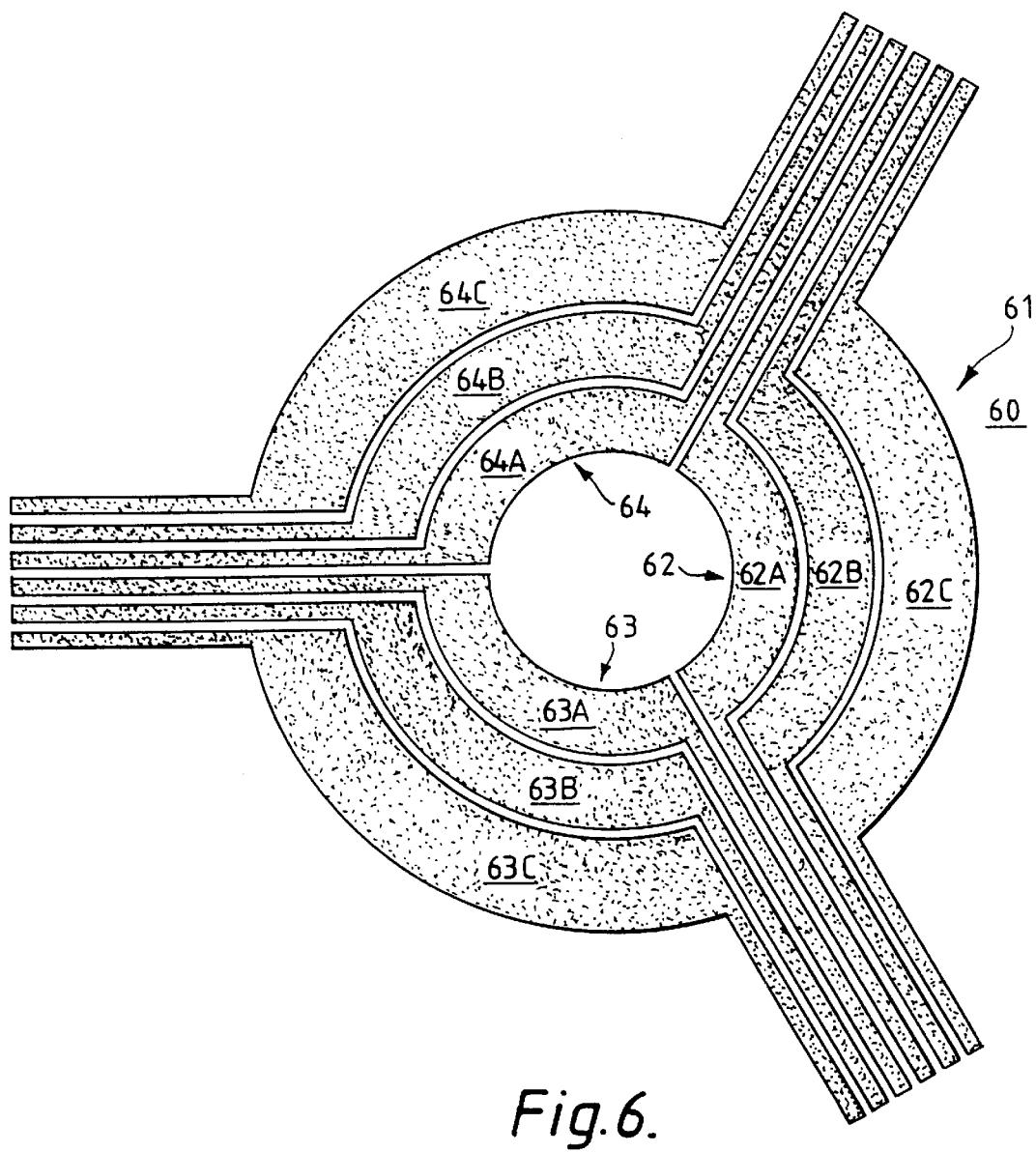
FIG. 6 shows a diagrammatic representation in plan view of a fifth embodiment of the invention having a symmetrically shaped coil arrangement including three stators for producing a rotating magnetic filed.

Referring now to FIG. 6, a miniature system in accordance with the invention which is particularly adapted for rotation of the disc is shown. Here a gold, planar, thin film, coil assembly generally indicated at 61 is fabricated onto a magnetically soft backing plane 60. The levitation coils comprise three stators 62, 63 and 64 each stator having two arc-shaped coil portions 62a, 62b, 63a, 63b, and 64a, 64b. Three arc-shaped stability coil portions 62c, 63c, and 64c are also provided outwardly spaced from stators 62, 63 and 64.

Whilst arc-shaped portions are preferred, it will be understood by those skilled in the art that the levitation coil portions and/or the stability coil portions may have a variety of shapes.

Stators 62, 63, and 64 are excited with high frequency currents of equal magnitude but differing phase displacements such that a rotating travelling magnetic field is produced which induces a current pattern in the disc that generates a force system producing a rotational torque to spin the disc, together with a levitational force. Typically the high frequency current has a magnitude of 200 mA rms and a frequency to 10 MHz.

An attractive electrostatic field, for example, can be provided by electrodes (not shown) so as to maintain the disc in equilibrium with respect to the base 60, even if the miniature system is tilted or inverted. When the miniature system is rotated, the disc precesses by an amount proportional to the rate of rotation of the miniature system. By detecting the magnitude of procession the angular velocity of the miniature system can be determined. Thus the system can function as a gyroscope and a rate of turn sensor. Furthermore, by measuring capacitance between the leviation coil portions, for example, 63a and 63b, the proximity of the rotor can be determined giving a measure of the rotor height and/or the angle of tilt, with respect to coil assembly 61.

Figure 7:
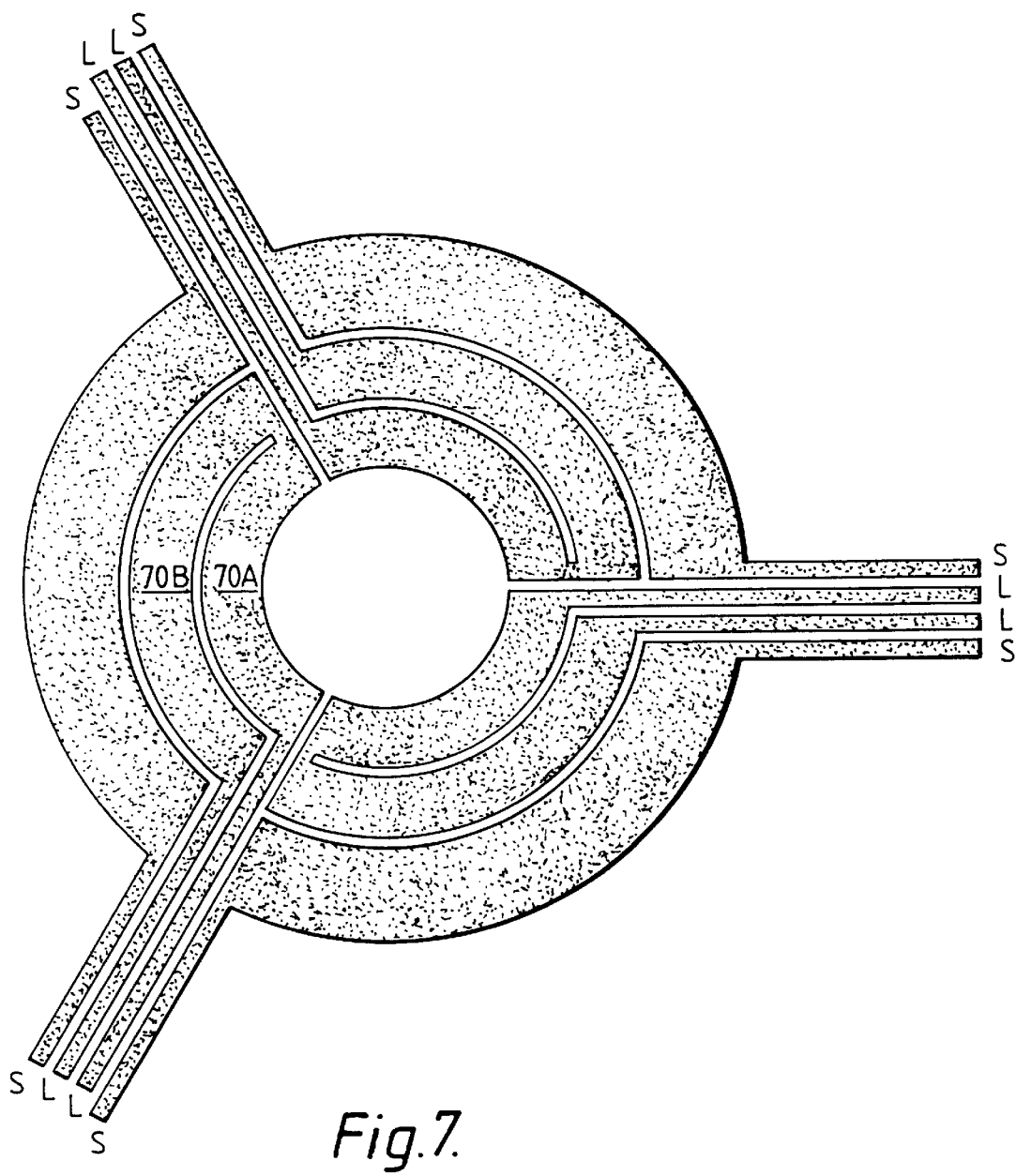
FIG. 7 shows a diagrammatic representation in plan view of a sixth embodiment of the invention having three stators, with each stator comprising a pair of coil portions connected in series.

Referring now to FIG. 7, an alternative embodiment of a three stator coil assembly is shown. Here, each pair of levitation coil portions 70a and 70b are electrically connected in series. The core assembly design shown can be adapted for ease of fabrication.

Whilst FIGS. 6 and 7 show three independent stators, designs with two to six stators or more may be considered. Increasing the number of stators however reduces the available surface area for the coil assembly itself due the increased number of connections required.

Designs composing three or more stators are preferred since this geometry provides for a two axis rotating gyroscope and furthermore allows for orthogonal acceleration detection as will be explained below.

Figure 8:
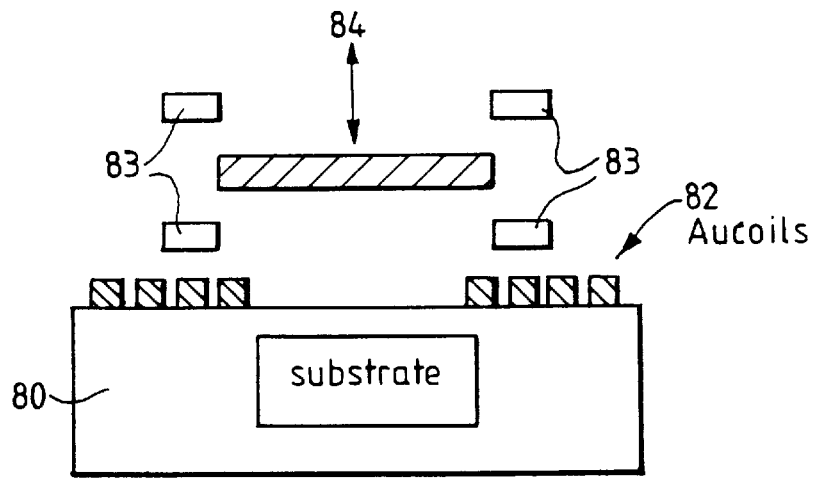
FIG. 8 shows a diagrammatic representation of a seventh embodiment of the invention for use as a linear accelerometer.

Referring now to FIG. 8, use of the system as a linear accelerometer is shown. Here, coil assembly 82 is disposed on substrate 80. Aluminium disc 81 is levitated above the substrate as afore described. Capacitive sensors 83 are disposed about the disc. Sensors 83 can be used to determine the rate of change of position of disc 81 when substrate 80 is moved towards or away from disc 81 as indicated by arrows 84 and hence acceleration can be determined.

Figure 9:
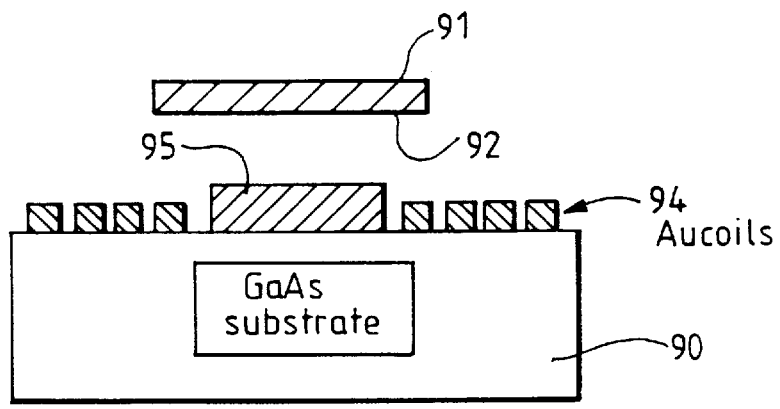
FIG. 9 shows a diagrammatic representation of an eighth embodiment of the invention for use in optical applications, wherein the microdisc comprises an optical mirror.

Referring now to FIG. 9, disc 91 is coated on one side with a highly reflective material such as gold or chromium so as provide an optical mirror. The mirror forms part of the laser cavity 95 and is levitated above substrate 90. By moving the position of this mirror the characteristics of the laser can be deliberately altered or tuned. Such a system allows rapid movement of the mirror, a long lifetime due to no mechanical stresses and production of a flat abberation free mirror which stays flat over its lifetime since no mechanical manipulation of the mirror is required. Coil assembly 94 can be fabricated about a semiconductor laser 95. The position of the disc can be controlled in a forced-feedback arrangement using capacitive sensors (not shown) positioned about or below the disc as hereinbefore described (not shown) to detect and provide information for the control the disc height and/or angle of tilt with respect to laser 95.

Figure 10:
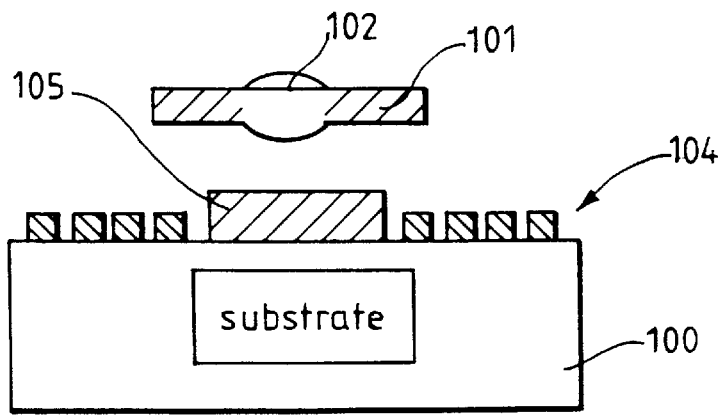
FIG. 10 shows a diagrammatic representation of a ninth embodiment wherein the microdisc comprises a micro lens.

Referring now to FIG. 10, coil assembly 104 is disposed about laser 105 on substrate 100. Aluminium disc 101 comprises a micro-lens 102, typically formed from plastic, disposed at its centre. This is can be used as a micro-telephoto lens. The use of this system in a closed loop or forced-feedback operation enables the height and/or angle of tilt of the disc with respect to the laser to be controlled precisely. Thus, the output from a photodiode or laser light source can be kept focused to its defraction limit. The system can be used to read high density information stored on a disc placed above the lens. Furthermore, the system can be used in chopping and/or multiplexing applications wherein one or more optical elements are distributed about the disc, so as to be positioned in front of a light source as required.

To prevent the aluminium disc sticking to the coils during power-down mode, a layer having a low sticking coefficient such as PTFE or diamond-like carbon can be applied to the top of the gold coils (typically 1 μm thick) and/or to the underside of the rotor.

As has been explained above, the portion and/or angle of tilt of the disc above the coil assembly can be precisely controlled.

From the above, other embodiments or applications for this invention will be apparent to those skilled in the art. These include a load carrying system, an all-in-one inertial guidance or navigation system wherein linear acceleration and two axis rotation sensing can be achieved as well as other embodiments such as a position sensing device for use, for example, in human-computer interfaces or remote control machines, a gas reaction sensing device using a micro-weighing device and a fluid viscosity measuring device as hereinbefore described. All alternative embodiments or applications evident to the man skilled in the art from the information contained herein are intended to fall within the scope of this application.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). This invention extends to any novel one, or any novel combination, of the features disclosed in this specification (including any accompanying claims, abstract and drawings), or to any novel one, or any novel combination, of the steps of any method or process so disclosed.

We claim:

1. A levitation system comprising:
    a high conductivity thin section body member having a greatest dimension of diameter less than 1500 µm;
    a repulsive levitating force generator on the body member;
    a stabilizer for producing a stabilizing force on the body member;
    a counterbalancing means for applying a counterbalancing force in a Z direction opposing the repulsive levitating force; and,
    means for producing a lateral stabilizing force on the body member in the plane of the body member in X-Y directions.

2. A system according to claim 1, in which the body member is a disc.

3. A system according to claim 1, in which the body member is a metal disc.

4. A miniature system according to claim 1, in which the body member has a diameter of from 300 to 800 µm and a thickness of from 2–50 µm.

5. A system according to claim 1, in which the levitating force generator on the body member further comprises a generator for applying an electromagnetically induced force on the body member.

6. A system according to claim 1, in which the levitating force generator further comprises a coil assembly.

7. A system according to claim 6, in which the levitating force generator comprises at least two coils, which coils are substantially concentric and which coils are arranged so that one of said coils is located inwardly of another of said coils.

8. A system according to claim 7, in which a first coil is spaced inwardly from a second coil and electrically connected in series.

9. A system according to claim 8, in which the means for producing a lateral stabilizing force comprises a coil spaced outwardly from said second coil.

10. A system according to claim 1, in which the counterbalancing means comprises means for generating an electrostatic force in the Z direction opposing the levitating force.

11. A system according to claim 1, in which the system is adapted for rotation of said body member.

12. A system according to claim 1, further comprising a means for subjecting the body member to a rotating field such that the body member is rotated in the applied field.

13. A system according to claim 12, in which the means for subjecting the body member to a rotating magnetic field comprises an asymmetric coil assembly.

14. A system according to claim 12, in which the means for subjecting the body member to a rotating magnetic field and the means for producing a levitating force on the body member comprise a distributed polyphase coil assembly.

15. A system according to claim 12, in which the means for subjecting the body member to a rotating magnetic field comprises a first coil assembly comprising two or more arc-shaped first coil portions positioned at regular intervals around a circle.

16. A system according to claim 15, in which the first coil assembly comprises two or more arc-shaped second coiled portions each of which is arranged opposite and outwardly spaced from a first coil portion.

17. A system according to claim 16, in which each of said first coil portions and said corresponding second coil portions are electrically connected in series so as to form a stator.

18. A system according to claim 17, in which the means for subjecting the body member to a rotating magnetic field comprises a first coil assembly comprising three or more coils positioned at regular intervals around a circle.

19. A system according to claim 18, in which the coils of the first coil assembly are quadrant shaped.

20. A system according to claim 18, in which the coils are arranged in a circle of substantially the same diameter as the body member.

21. A system according to claim 15, in which the coils or coil portions of the first coil assembly are arranged on a base beneath the body member.

22. A system according to claim 12, further comprising a second coil assembly, wherein the shape and location of the second coil assembly is such that, when the second coil assembly is driven with a high frequency current, the interaction of the coil current and the induced body member current generates a force system which levitates the body member in the Z direction and also provides lateral stability in the plane of the body member in the X-Y directions.

23. A system according to claim 22, in which there are from one to two coils in the second coil assembly, and these are arranged on a base within the circle of the first coil assembly.

24. A system according to claim 22, in which the second coil assembly comprises two or more arc-shaped third coil portions, and these are arranged on a base outside the circle of the first coil assembly.

25. A system according to claim 22, in which the coils or coil portions of the first and second coil assemblies are deposited on a substrate layer of a soft magnetically permeable material.

26. A system according to claim 25, in which an insulating material is positioned between the coils or coil portions and the soft magnetic material.

27. A system according to claim 25, in which the soft magnetic material is formed into slots into which the coils are laid.

28. A system according to claim 1, in which the means for applying a counterbalancing force comprises a third coil or coil assembly mounted above the body member.

29. A system according to claim 28, in which the third coil is mounted on a magnetically permeable substrate.

30. A system according to claim 1, in which the means for applying a counterbalancing force comprises a system of electrodes distributed among the first or second coil assemblies.

31. A system according to claim 30, in which the electrodes are positioned within one or more coils or coil portions of the first and second coil assemblies.

32. A system according to claim 30, in which the first and second coil assemblies and the electrode system are formed as one part by connecting capacitors in series with the coils in a manner that allows parts of the coils to be excited with differing DC voltages while conducting a high frequency alternating current.

33. A system according to claim 1, that is fully surrounded by an enclosure such that on removal of the electric current supply to the levitating system the body member will settle in a position on the base such that on reinstatement of the supply the levitation can be reestablished.

34. A system according to claim 1, that is provided with a reduced pressure environment, or a nitrogen, or inert gas, atmosphere.

35. A drive system for a miniature rotor, the rotor comprising a body member of diameter less than 1500 µm, which comprises:
- a magnetic field generator for subjecting the body member to a rotating magnetic field such that the body member is rotated in the applied field;
- a force generator producing a repulsive levitating force on the body member; and,
- a distributed polyphase coil assembly.

36. A method for driving a rotatable body member of diameter less than 1500 µm, which comprises:
- subjecting the body member to a rotating and levitating magnetic field such that the body member is rotated and levitated in the applied field produced by a distributed polyphase coil assembly; and,
- applying a repulsive levitating force to the body member while it is rotated in the magnetic field.

37. A method according to claim 36, in which the body member is rotated at a speed of from 10,000 to 10,000,000 rpm.

38. A method according to claim 36, in which the body member is levitated to a height of from 1 to 10 µm.

39. A method according to claim 36, in which the rotating magnetic field is produced by applying high frequency currents of equal magnitude but differing phase displacement to the coils or coil portions of a first coil assembly.

40. A method according to claim 36, in which the levitation force is provided at least in part by applying a high frequency current to a second coil assembly.

41. A method according to claim 36, in which a counterbalancing force to the levitating force is applied to the body member.

42. A method according to claim 41, in which the counterbalancing force is provided either by applying a high frequency current to a third coil or coil assembly disposed above the body member, or by applying a controlled DC voltage to electrodes positioned above or beneath the body member.

43. The system of claim 11, further comprising one or more miniature gyroscope components.

44. The system of claim 11, further comprising one or more micromotor components.

45. The system of claim 1, further comprising one or more miniaturized integrated navigation system components.

46. The system of claim 11, wherein the body member is used as a sensing element by monitoring the angle of tilt of the body member as it precesses under gyroscopic forces.

47. A system according to claim 46, in which the orientation of the body member is sensed by sensing electrodes disposed beneath the body member.

48. The system of claim 1, wherein the body member comprises a reflective surface.

49. The system of claim 48, wherein the body member is arranged so as to form part of a laser cavity and whereby the characteristics of the laser can be controlled by controlling the height of levitation of the body member, and hence the cavity length and/or the orientation of the body member having regard to a longitudinal axis of the laser cavity.

50. The system of claim 1, wherein the body member comprises a lens.

51. The system of claim 50, in which the lens is centrally located within the body member.

52. The system of claim 1, wherein the system is adapted to carry a load on the body member.

53. The system of claim 1, further comprising means for detecting the rate of change in height and/or angle of orientation of the body member with respect to the means for subjecting the body member to a levitating force, when said means for a levitating force is moved with respect to the body member.

54. The system of claim 14, in which the means for subjecting the body member to a levitating force and the means for producing a rotating force comprise at least three stators disposed on a base, each stator comprising an inner coil portion and an outer coil portion, wherein the coil portions are used as sensing elements to determine the angle of tilt and/or height of the body member and rate of change of the angle of tilt and/or height of the body member with respect to the stators, when the base is moved with respect to the body member.

55. The system of claim 54, in which the stators are arc shaped.

56. The system of claim 1, further comprising one or more position sensing components.

57. The system of claim 1, further comprising one or more gas reaction sensor components.

58. The system of claim 1, further comprising one or more viscosity measuring components.

59. A levitation system for use in miniature rotor systems, miniature motor systems, miniature motion detection systems, and optical systems comprising:
- a high conductivity thin section body member having a greatest dimension of diameter less than 1500 µm;
- means for producing a repulsive levitating force, preferably an electromagnetic force on the body member;
- a stabilizer for producing an electrostatic stabilizing force on the body member;
- a counterbalancing means for applying a counterbalancing force in a Z direction opposing the levitating force; and,
- means for producing a lateral stabilizing force on the body member in the plane of the body member in X-Y directions.

60. A levitation system for use in miniature rotor systems, miniature motor systems, miniature motion detection systems, and optical systems comprising:
- a high conductivity body member having a greatest dimension of diameter less than 1500 µm; characterized by:
  - means for producing a repulsive levitating force acting on the body member; and
  - counterbalancing means for applying a stabilizing force opposing the repulsive levitating force.

61. The system of claim 60, wherein the repulsive levitating force is an electromagnetic force, and wherein the stabilizing force is an electrostatic force.

* * * * *